United States Patent [19]

Nagasaka et al.

[11] Patent Number: 4,655,546
[45] Date of Patent: Apr. 7, 1987

[54] ROTARY INDICATING DEVICE

[75] Inventors: Chikao Nagasaka, Nagoya; Hiroyuki Kato, Aichi; Hirofumi Ohno, Nagoya; Shinichi Irifune, Yokkaichi, all of Japan

[73] Assignee: Kabushiki Kaisha Tokai Rika Denki Seisakusho, Aichi, Japan

[21] Appl. No.: 586,089

[22] Filed: Mar. 5, 1984

[30] Foreign Application Priority Data

Feb. 6, 1984 [JP] Japan .................................. 59-20365

[51] Int. Cl.$^4$ .......................... G02B 5/136; G02B 5/10
[52] U.S. Cl. ........................................ 350/99; 350/613
[58] Field of Search ................. 350/97, 107, 109, 614, 350/120, 613, 99; 40/587, 613; 116/46; 301/375 A; 356/23, 24

[56] References Cited

U.S. PATENT DOCUMENTS

| | | | |
|---|---|---|---|
| 1,118,289 | 11/1914 | Jurschewitz | 350/120 |
| 3,471,236 | 3/1964 | Pearson | 356/24 |
| 3,609,585 | 9/1971 | Hufnagel | 350/613 |
| 3,758,190 | 10/1977 | Douglas | 350/99 |
| 4,116,539 | 9/1978 | Evans | 350/613 |
| 4,194,809 | 3/1980 | Campagna | 350/99 |
| 4,340,031 | 7/1982 | Niedermeyer | 350/613 |

Primary Examiner—John K. Corbin
Assistant Examiner—Loha Ben
Attorney, Agent, or Firm—Jackson & Jones

[57] ABSTRACT

The disclosure relates to a rotary indicating device preferably in use, for example, for wheel covers for motor vehicles. The device includes a base member adapted to be rotated about a rotary axis and having an indication region thereon. The indication region indicates a desired image and comprises a plurality of reflection faces. The reflection faces are inclined in the same direction and also at the same angle with respect to a standard plane perpendicular to a rotary axis of the rotary base member. Thus, when the base member rotates, the observer can visually recognize the image as a clear single image due to the after image phenomenon.

10 Claims, 15 Drawing Figures

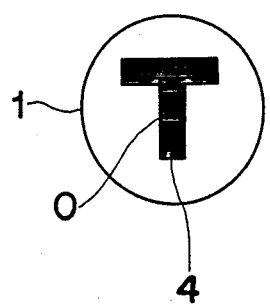
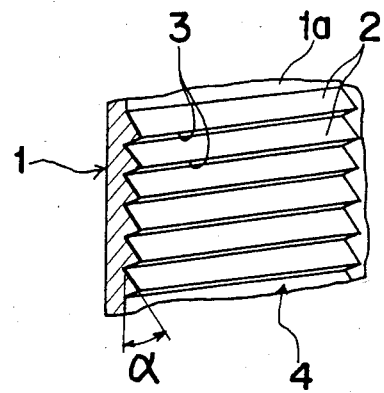
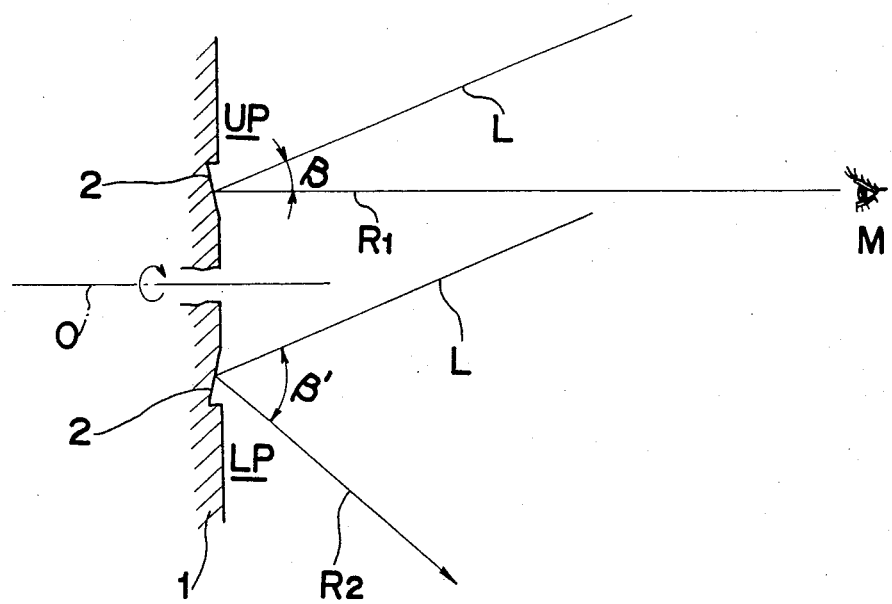

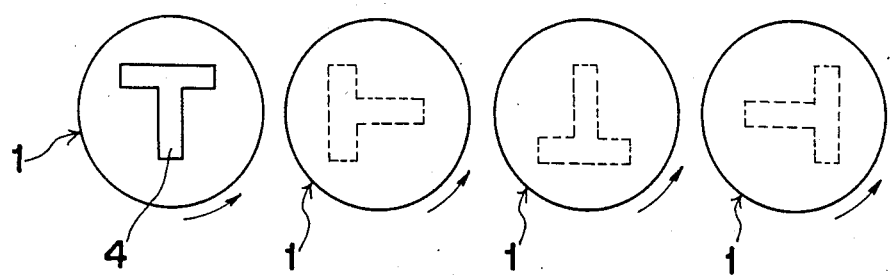
Fig. 4a  Fig. 4b  Fig. 4c  Fig. 4d
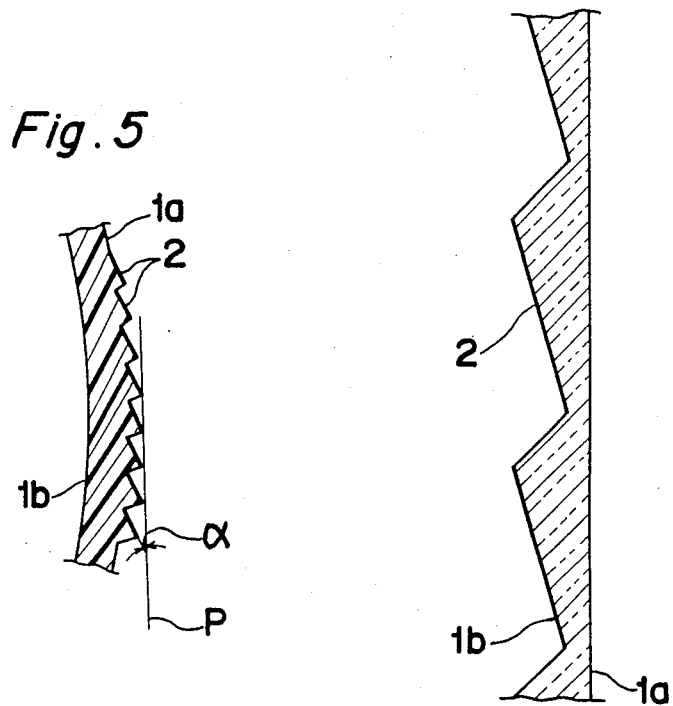
Fig. 5
Fig. 6

ROTARY INDICATING DEVICE

BACKGROUND OF THE INVENTION

The present invention relates generally to a rotary indicating device in use, for example, for wheel covers of a motor vehicle, indication boards of advertising apparatus, ornamental elements for toys, and the like, and more particularly to a rotary indicating device which comprises a base member having an indication surface, the indication surface including an indicating region formed thereon and representing a desired image such as pictures, letters, marks and the like, the indication region being seen by an observer as a static visual image due to the after image phenomenon during the rotation of the base member.

Generally, the image formed on a rotary device is not able to be visually recognized by an observer as a clear image during the rotation of the rotary device. It will be readily seen that if such an image provided for the rotary device could be visually recognized by the observer as a clear image, it will produce an improved ornamental efficiency.

From the above viewpoint, there has been conventionally provided a rotary indicating device, namely a wheel cover in use for motor vehicles, in Japanese Utility Model Laid-open Publication No. 133923/1974. The above wheel cover comprises a cover body, and an ornamental disc relatively rotatably mounted on the front surface of the body. The ornamental disc has a shaft concentrically extending from the rear surface thereof. The shaft passes through and is relatively rotatably supported by a journal mounted on the central portion of the body, and has, at its rear portion positioned beside the rear surface of the body, a weight for preventing the ornamental disc from rotating together with the body. Therefore, the image formed on the ornamental disc may be maintained in a static manner with respect to the cover body rotating together with the wheel of the vehicle, so that the image can be visually recognized by the observer who sees the advancing vehicle.

The known wheel cover as described above, however, has such disadvantage that it is complex in construction.

SUMMARY OF THE INVENTION

It is therefore an essential object of the present invention to provide a rotary indicating device which is simple in construction, in which the desired image is integrally formed on an indicating surface of a base member adapted to be rotated about a rotary axis, and the image can be visually recognized as a static image by the observer due to the after image phenomenon during the rotation of the base member.

It is another object of the present invention to provide a rotary indicating device, in which said image formed on the base member can be visually recognized by the observer even if the observer and the light source respectively take different positions with respect to the rotary indicating device.

In accomplishing these and other objects, according to a first embodiment of the present invention, there is provided a rotary indicating device which comprises a base member adapted to be rotated about a rotary axis and having an indication surface, the indication surface including an indication region formed thereon and representing a desired image. The indication region comprises a plurality of image elements. The image elements consist of flat reflection faces respectively extending in a predetermined direction in parallel relation to each other, and non-reflection faces also extending in said predetermined direction to connect neighboring reflection faces to each other.

With the first embodiment as described above, when the base member is rotated at a rotational speed over the predetermined value, the observer located at an appropriate fixed position with respect to the device can continuously receive the reflection lights from the reflection faces of the base member once per a rotation is visually recognize the desired image as a static image due to the after image phenomenon.

According to the above embodiment, since the reflection faces for collectively representing the desired image can be integrally formed on the indication surface of the base member per se, that is to say, a special additional member, such as the ornamental disc provided with a wheel cover as previously described, is not necessary, and rotary indicating devices simple in construction can be provided.

According to a second embodiment of the present invention, there is provided a rotary indicating device which comprises a base member adapted to be rotated about a rotary axis and having an indication surface, the indication surface including an indication region formed thereon and representing a desired image. The indication region comprises a plurality of image elements which respectively consists of reflection faces. The reflection faces are respectively curved at the same radius of curvature and extending in parallel relation to each other.

With the second embodiment as described above, the incident lights directed toward the base member are reflected at the curved reflection faces in the various directions in the certain range of angle. Thus, even if the observer and the light source respectively take different positions with respect to the rotary base member, the image formed on the base member can be visually recognized by the observer.

BRIEF DESCRIPTION OF THE DRAWINGS

These and other objects and features of the present invention will become apparent from the following description taken in conjunction with the preferred embodiments thereof, with reference to the accompanying drawings, in which:

FIG. 1 is a front elevational view of a rotary indicating device according to a first embodiment of the present invention;

FIG. 2 is an enlarged fragmental view illustrating an essential part of the rotary base member shown in FIG. 1;

FIG. 3 is a schematic diagram explanatory of the manner in which the incident light is reflected at the reflection faces of the rotary indicating device shown in FIG. 1;

FIGS. 4a, 4b, 4c and 4d are, respectively, front elevational views illustrating the rotary indicating device in FIG. 1 at different rotary positions;

FIGS. 5 and 6 are sectional views respectively illustrating the modifications of the first embodiment of the present invention;

DETAILED DESCRIPTION OF THE INVENTION

Figure 7:
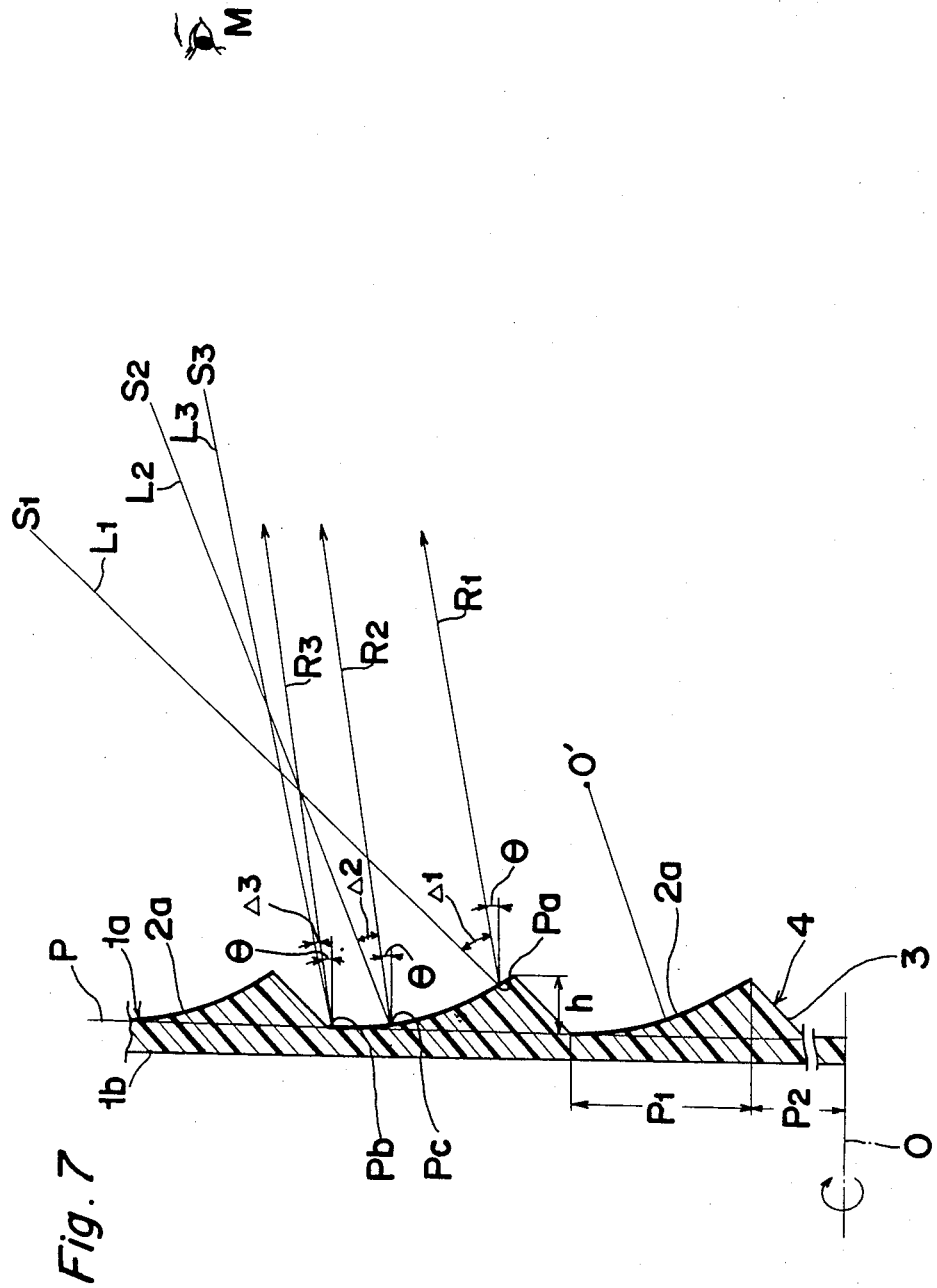
FIG. 7 is a fragmentary sectional view according to a second embodiment of the present invention, explanatory of the manner in which the incident light is reflected at the reflection faces of the base member.

Before the description of the present invention proceeds, it is to be noted that like parts are designated by like reference numerals and symbols throughout several views of the accompanying drawings.

Referring first to FIGS. 1 and 2, there is provided a rotary indicating device according to a first embodiment of the present invention which may be preferably employed, for example, for wheel covers of motor vehicles, indication boards of advertising apparatus, ornamental elements for toys, and the like. The rotary indicating device has a base member 1 which is generally in the form of a circular plate and is preferably made with synthetic resin having a dark color with poor light reflection. The base member 1 is provided with a front surface, namely indication surface 1a in this embodiment, including an indication region 4 formed thereon and representing a desired image, i.e., by way of example, an alphabet letter "T", in the illustrated embodiment. As shown, the indication region 4 arranged in the form of "T" has a saw-teeth cross-section and comprises a plurality of image elements which consist of flat reflection faces 2 respectively extending in a predetermined direction in parallel relation to each other to collectively form "T", and non-reflection faces 3 also extending in said predetermined direction to connect the neighboring reflection faces 2 to each other. Each reflection face 2 is covered by a reflected layer such as a metal plating layer or a deposited metal layer.

The reflection faces 2 are so designed as to be inclined in the same direction and at the same appropriate angle $\alpha$ with respect to a standard plane, i.e., the front surface 1a, perpendicular to a rotary axis O about which the base member 1 is adapted to be rotated.

Referring to FIG. 3, which diagramatically illustrates a manner in which a reflection face 2 takes two rotary positions UP and LP diametrically opposite to each other with respect to the rotary axis O. On the supposition that the light L from a light source (not shown) is being projected toward the base member 1 and that observer M is located at such a position with respect to the rotary indicating device that the reflective light R1 reflected at a reflection face 2 located at the upper rotary position UP is directed toward the eyes of the observer M, the angle between the incident light L and the reflected light R1 being indicated by a reference symbol $\beta$, the reflected light reflected at the reflection faces which are positioned at various rotary positions including the lower position LP and other than said upper rotary position UP are not respectively directed toward the eyes of the observer M. For example, the reflected light reflected at the reflection face 2 taking the lower rotary position LP is directed below the eyes of the observer, the angle $\beta'$ between the incident light L and the reflected light R2 assuming an angle remarkably larger than the angle $\beta$. Accordingly, the observer taking an appropriate fixed position with respect to the rotary indicating device as described above, may visually recognize the image "T" once per a single rotation of the base member 1, and thus when the base member rotates at a rotational speed over a predetermined value, as shown in FIGS. 4a to 4d, the observer may visually recognize the individual images reflected from the indication region taking the upper rotary position UP, i.e., the rotary position shown in FIG. 4a, each rotation thereof, as a single static image "T" due to the image phenomenon.

Referring to FIG. 5, there is provided a modification in which the indication surface 1a is curved, but each angle $\alpha$ of the reflection faces 2 with respect to the standard plane P is still maintained.

Referring now to FIG. 6, there is shown a base member formed of a transparent plate comprising a front surface 1a and a rear surface 1b which forms the indication surface. The rear surface includes a series of flat reflection surfaces or faces 2 which are joined by non-reflection faces so that light incident on the front surface will pass through the transparent plate and be reflected from the reflection surfaces 2 to an observer positioned in front of the base member.

Referring to FIG. 7, there is provided a further improved rotary indicating device according to a second embodiment of the present invention, in which the indication region 4 formed on the front surface 1a of the base member 1 has, as same as the first embodiment, a saw-teeth cross-section and comprises a plurality of image elements which consist of elongated reflection faces 2a, and elongated non-reflection faces 3 for connecting the neighboring reflection faces 2a to each other. But, according to the second embodiment, each reflection faces 2a are respectively, formed concave at the same radius of curvature, and slightly outwardly extend in parallel relation to each other from the standard plane P perpendicular to the rotary axis O. In addition, the width P1 of each reflection face 2a is so designed as to be sufficiently larger than the width P2 of each non-reflection face 3.

Figure 8:
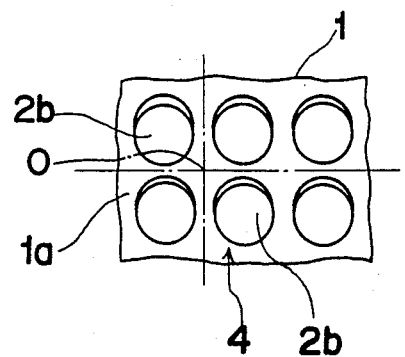
FIG. 8 is a front elevational view illustrating a modification of the second embodiment.
Figure 9:
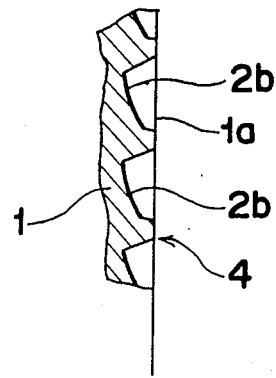
FIG. 9 is a longitudinally sectioned view of the base member shown in FIG. 8.
Figure 10:
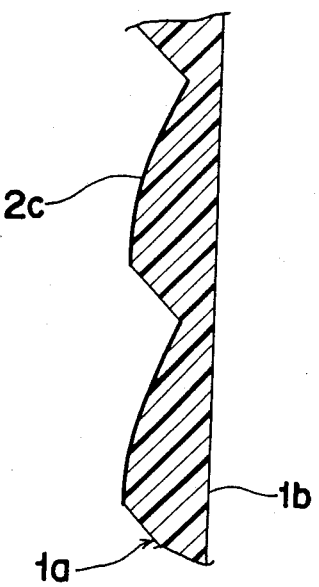
FIG. 10 is a view similar to FIG. 7 and illustrating a modification of the second embodiment.

The reflection faces 2a according to the above second embodiment may be modified in various manners. For example, as shown in FIGS. 8 and 9, the reflection faces 2b may be composed of fragmental faces, namely in this modification bottom faces of recesses formed and scattered in the indication region 4, the bottom faces 2b being respectively curved in the same direction. Furthermore, each reflection face 2c may be also formed convex as shown in FIG. 10.

Referring again to FIG. 7, assuming now that the observer M is located at a fixed position with respect to the rotary indicating device and the light source takes three typical positions S1, S2 and S3 different from each other in height, with respect to the rotary base member 1, the different incident lights L1, L2 and L3 from the light source at S1, S2 and S3 may be reflected at each reflection faces 2a and directed toward the eyes of the observer M. In other words, in connection with the incident light L1, the light R1 reflected at a relatively appropriately lower point Pa of each reflection face 2a may be directed toward the eyes of the observer M, an angle $\theta$ being made between the reflected light R1 and the rotary axis O. Meanwhile, in connection with the other light L2 and L3, the light R2 and R3 respectively reflected at a relatively appropriately higher position Pb and an intermediate position Pc of each reflection face 2a may be also directed toward the eyes of the observer, the R2 and R3 being respectively making the same angle $\theta$ with respect to the rotary axis O. Thus, the observer M can visually recognize the image on the base member 1 even if the light source takes various positions with respect to the base member 1. As a matter of course, the angle $\Delta 1$, $\Delta 2$ and $\Delta 3$ between each of reflected lights R1, R2 and R3, and the rotary axis O should be included at an appropriate range of angle which is defined by the radius of curvature and the width P1 of each reflection face 2a and the inclination of each reflection face 2a to the standard plane P and other dimensions. In addition, the observer M may visually recognize the image on the base member 1 even if he takes by himself different positions with respect to the base member 1 and the light source. Furthermore, if the observer M sees the rotating base member 1 while he is moving with respect to the base member 1, the image appears to him to be slightly rotating.

Figure 11:
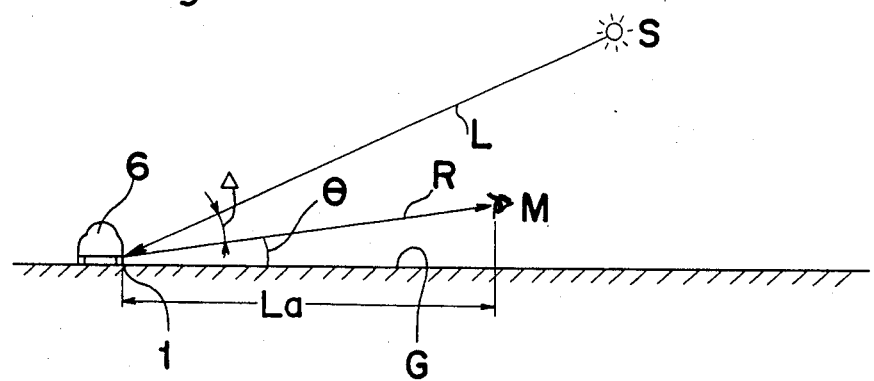
FIGS. 11 and 12 are, respectively, a side elevational diagram and a top plan view respectively explanatory of a manner in which an incident light is reflected at a wheel cover mounted on a motor vehicle, the wheel cover being composed of the base member according to the second embodiment.
Figure 12:
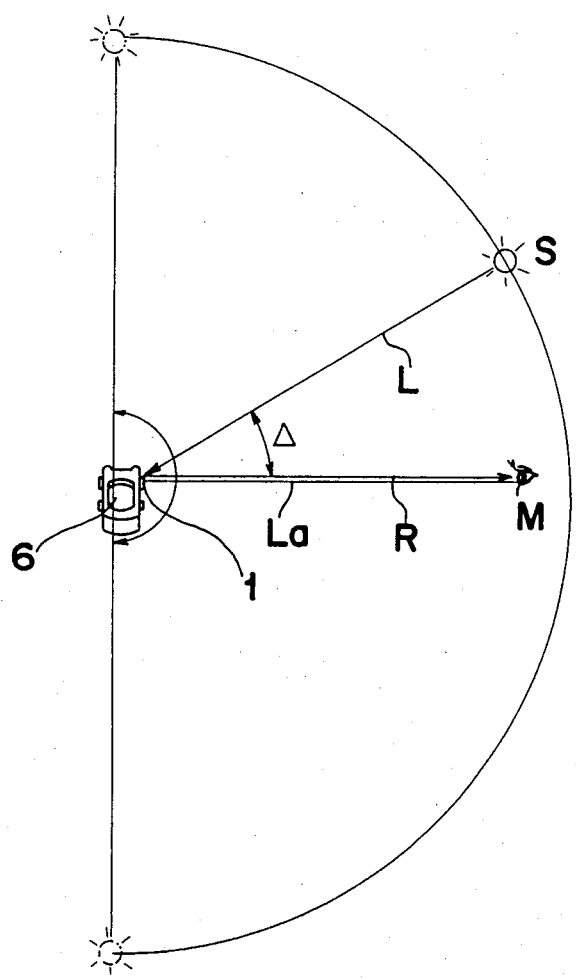

It is to be noted that the above second embodiment may be preferably applied to wheel covers for motor vehicles. Referring to FIGS. 11 and 12, assuming that the observer M is located at a certain fixed position in a street and a motor vehicle 6 is passing in a linear direction ahead of the observer M and the sun S as the light source takes a certain position as shown in FIGS. 11 and 12, the angle $\Delta$ made between the incident light L and the line La connecting the motor vehicle 6 and the observer M gradually varies depending on the advancing position of the motor vehicle 6. Furthermore, as a matter of course, the sun S takes various positions with respect to the motor vehicle 6 and the observer M to change the angle $\Delta$ depending on the time of day and also the seasons. Still further, said angle $\Delta$ is also changeable due to the angle $\theta$ made between the reflected light R and the surface G of the street, i.e., the distance between the observer M and the motor vehicle 6. However, according to the above second embodiment, even if the angle $\Delta$ changes, the observer M can visually recognize the image on the wheel cover 1 as long as the angle $\Delta$ is included in a permissible range of angle which is defined by the configuration and dimensions of the reflection faces 2a on the wheel cover.

The inventors of the present invention have carried out the following experiment with a model and obtained sufficient results as will be described later.

CONDITIONS FOR THE EXPERIMENT (1) Configurations

The model was formed similar in configuration to the wheel cover for the motor vehicle and so as to have two neighboring indication regions respectively representing the same image "T", one indication region having the reflection faces 2 according to the first embodiment, while the other indication region having the reflection faces 2a according to the second embodiment.

(2) Dimensions (a) A width P1 of both reflection faces 2 and 2a . . . 0.76 mm.

(b) Distance h of both reflection faces 2 and 2a . . . 0.24 mm.

(c) Radius of the curvature of the reflection face 2a . . . 1.34 mm.

(3) Operating Conditions (1) Rotational speed of the motor . . . 1,500 rpm.
(2) As shown in the following TABLE 1, the experiment has been carried out under various conditions determined by the combination of the angles Y and $\theta$ selected arbitrary. In addition, the conditions are indicated by marks X in the TABLE 1, and the symbol Y indicates the angle made between the incident light and the rotary axis of the base member, while the symbol $\theta$ indicates the angle made between the reflected light and said rotary axis.

TABLE 1

| ANGLE (γ) | ANGLE ($\theta$) | | | | | | |
|---|---|---|---|---|---|---|---|
| | 10° | 15° | 20° | 25° | 30° | 35° | 45° |
| 10° | X | | X | | X | | X |
| 15° | X | | | | | | |
| 25° | X | X | | X | | X | |
| 35° | X | | | | | | |
| 40° | X | | | X | | | |
| 45° | X | | | | | | |

RESULT (1) Regarding the image according to the first embodiment, the image could be distinctively recognized at the four conditions, i.e., I angle Y (10°), angle $\theta$ (20°), II angle Y (15°), angle $\theta$ (10°), III angle Y (25°), angle $\theta$ (10°), IV angle Y (25°), angle $\theta$ (15°).

(2) Regarding the image according to the second embodiment, the image could be distinctly recognized under all of the conditions.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A rotary indicating device which comprises a base member adapted to be rotated about a rotary axis and having an indication surface, said indication surface including an indication region formed thereon and representing a desired image, said indication region comprising a plurality of image elements which consists of flat reflection faces respectively extending in a predetermined direction in parallel relation to each other, and non-reflection faces also extending in said predetermined direction to connect the neighboring reflection faces to each other; whereby, when the base member rotates at a rotational speed over the predetermined value, an observer located at an appropriate fixed position with respect to the device can continuously receive light rays reflected from the reflection faces of the base member once per rotation to see the desired image as a static image due to the after image phenomenon.

2. A rotary indicating device as claimed in claim 1, wherein said indication surface is formed flat.

3. A rotary indicating device as claimed in claim 1, wherein said indication surface is formed curved.

4. A rotary indicating device as claimed in claim 1, wherein said indication surface is composed of a front surface of said base member.

5. A rotary indicating device as claimed in claim 1, wherein said base member is made by a thin transparent plate, of a rear surface of which said indication surface is composed.

6. A rotary indicating device which comprises a base member adapted to be rotated about a rotary axis and having an indication surface, said indication surface including an indication region formed thereon and representing a desired image, said indication region comprising a plurality of image elements which respectively consist of reflection faces, said reflection faces respectively being curved at the same radius of curvature and extending in parallel relation to each other; whereby, when the base member rotates at a rotational speed over the predetermined value, an observer located at an appropriate fixed position with respect to the device can continuously receive light rays reflected from the reflection faces of the base member once per rotation to see the desired image as a static image due to the after image phenomenon.

7. A rotary indicating device as claimed in claim 6, wherein said reflection faces are respectively composed of elongated faces extending in a predetermined direction.

8. A rotary indicating device as claimed in claim 6, wherein said reflection faces are composed of fragmental faces scattered in said indication region.

9. A rotary indicating device as claimed in claim 6, wherein each of said reflection faces is formed convex.

10. A rotary indicating device as claimed in claim 6, wherein each of said reflection faces is formed concave.

* * * * *